July 9, 1963 G. H. WAYNE ETAL 3,097,302
PHOTOSENSITIVE MODULAR SHAFT POSITION ENCODER
Filed March 3, 1961 4 Sheets-Sheet 1

INVENTORS
GEORGE H. WAYNE
DONALD E. WHITNEY
BY

ATTORNEYS

July 9, 1963 G. H. WAYNE ETAL 3,097,302
PHOTOSENSITIVE MODULAR SHAFT POSITION ENCODER
Filed March 3, 1961 4 Sheets-Sheet 2

INVENTORS
GEORGE H. WAYNE
DONALD E. WHITNEY
BY

ATTORNEYS

INVENTORS
GEORGE H. WAYNE
DONALD E. WHITNEY

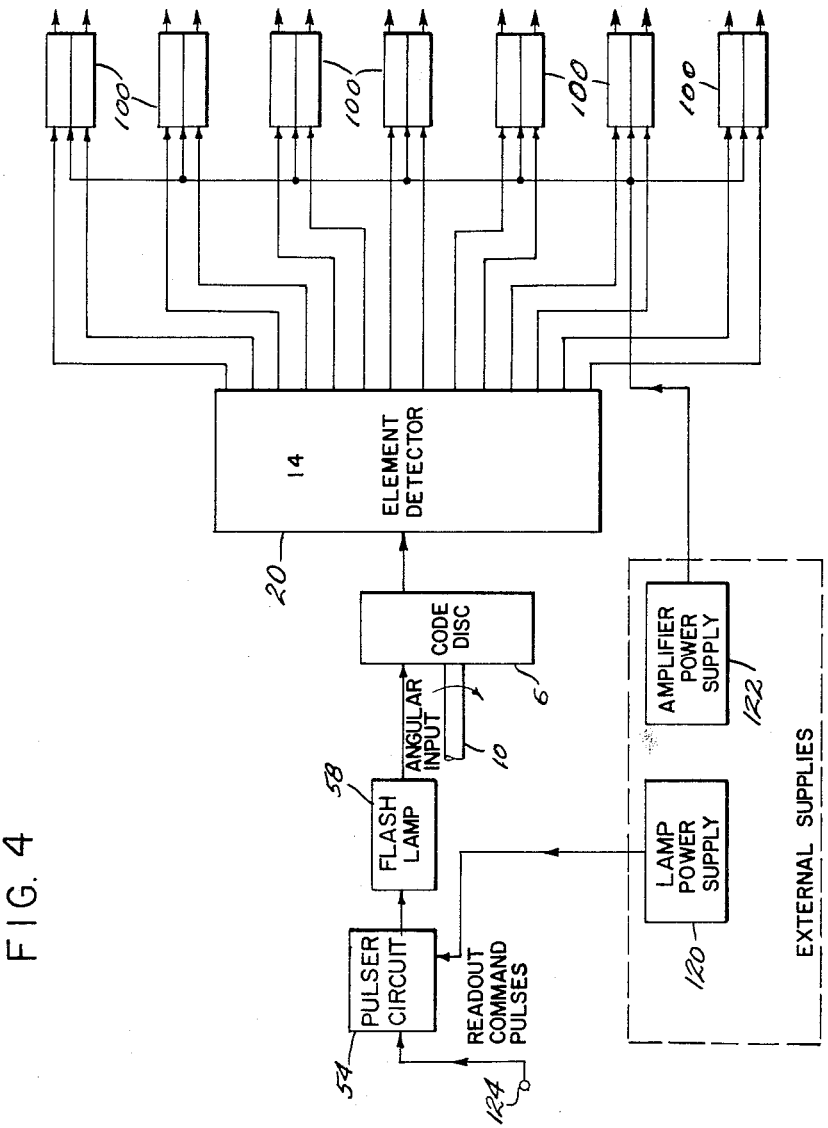

United States Patent Office 3,097,302
Patented July 9, 1963

3,097,302
PHOTOSENSITIVE MODULAR SHAFT POSITION ENCODER
George H. Wayne and Donald E. Whitney, Newton, Mass., assignors to Wayne-George Corporation, Boston, Mass., a corporation of Massachusetts
Filed Mar. 3, 1961, Ser. No. 93,198
17 Claims. (Cl. 250—208)

The present invention relates to a shaft position encoder and more particularly to a photoelectric shaft position encoder of plug-in modular construction.

As is well known, a shaft position encoder is a device which produces an electrical output indicative of the angular position of a shaft relative to a predetermined starting or reference position. Generally, this electrical output is in binary code, with different binary outputs obtained for different positions of the shaft. Usually these encoders are of the optical, i.e., photoelectric type, but they may also be of the type having magnetic or other kinds of signal generating means. Essentially, they comprise a coded disk which is operatively coupled to a rotatable shaft, stationary means located at a reference position for reading the disk and for generating a coded electrical signal representative of the instantaneous position of the disk and the shaft, and means for extracting the coded signal for application to a computer, motor controller, or other instrument. Generally also the encoder includes means for amplifying the coded signal, although the amplifier system may be mounted externally of the encoder if desired. In the case of optical encoders, means are provided for generating a strobe or continuous light for illuminating the code disk.

Although fundamentally encoders are simple in organization, heretofore the necessary duplication of information channels and the practical end use requirements for compactness and precision have resulted in unduly complex assemblages of parts which were difficult to repair and test and overly sensitive to shock, moisture, and other environmental factors. By far, the problem of repair has been most critical, particularly within submarines where soldering is not permitted or in isolated field installations such as in the Arctic region where soldering is most difficult. Moreover, in many field installations, when an encoder becomes inoperative, it is essential that it be made operative again within minutes. Heretofore, because of the impossibility or difficulty of repairs in the field, it has been deemed wisest to substitute a new encoder and to ship the defective encoder back to the manufacturer or to a suitable repair base. This has meant having not one, but several, spare encoders on hand for emergency use. While this is a safe practice, it is also expensive.

Accordingly, there has existed a need for improved encoder packaging techniques calculated to facilitate field maintenance and minimize repair time without sacrifice of precision of construction, dependability of operation, and adaptability of use. In particular, there has existed a need for a compact encoder package of unitary, easily replaceable subassemblies.

Accordingly, the primary object of the present invention is to provide an optical shaft position encoder of modular plug-in construction which is relatively simple to disassemble and repair.

A further specific object of the present invention is to provide an optical shaft position encoder which includes amplifier and strobe light modules, said modules being plugged into receptacles attached to a central hollow supporting structure which is mounted on a module containing a rotatable code disk and a photosensitive output signal generator.

A more specific object of the present invention is to provide a shaft position encoder comprising plug-in amplifier modules which are arranged in symmetrical arrays on opposite sides of the central axis of the encoder.

Another object of the present invention is to provide an optical shaft position encoder of plug-in modular construction which includes standby elements which can be readily brought into use as replacements for burned out elements.

Still a more specific object is to provide an optical shaft encoder which comprises, a cylindrical module containing a rotatable code wheel adapted to be rotated by an operating drive shaft, said module having an end wall with a radial slit through which light may be projected onto the code wheel, a plurality of light sensitive elements mounted within the module in position to be activated by light projected through the code wheel, a supporting structure detachably secured to said module, said structure carrying a plurality of plug-in connectors, a plurality of amplifier modules each plugged into separate connectors, a light module plugged into another of said connectors, means for supplying power to said amplifier and light modules, and means interconnecting the amplifier modules and the light sensitive elements whereby electrical signals generated by the light sensitive element in response to light projected through the code wheel by the light module are amplified in the amplifiers and thereafter are made available for use outside of the encoder.

Other objects and many of the attendant advantages will become more readily apparent as recourse is had to the following detailed specification when considered together with the accompanying drawings wherein:

FIG. 4 is a block diagram of the component sections of the encoder of FIGS. 1 and 2.

Figure 1:
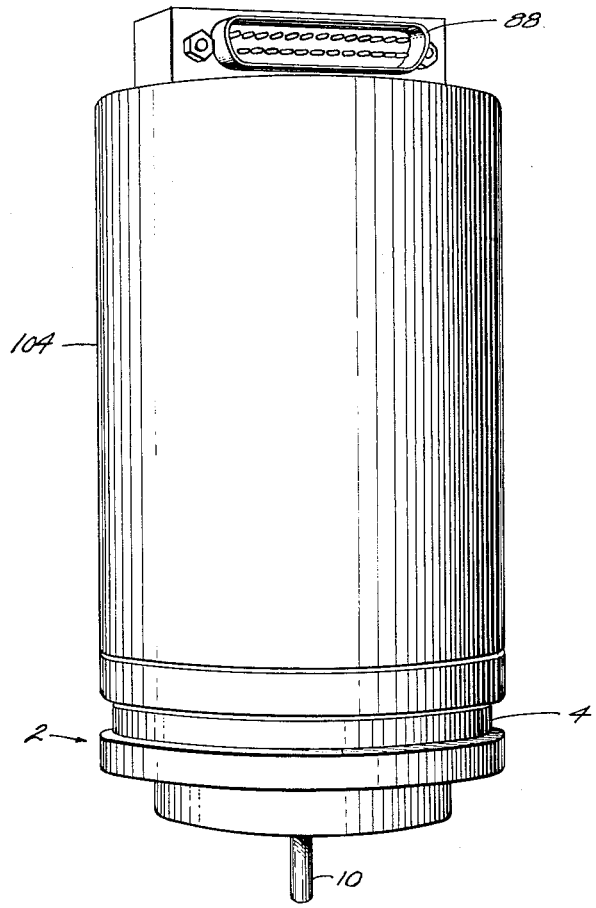
FIG. 1 is a perspective view of a preferred embodiment of an optical shaft position encoder embodying the present invention.
Figure 2:
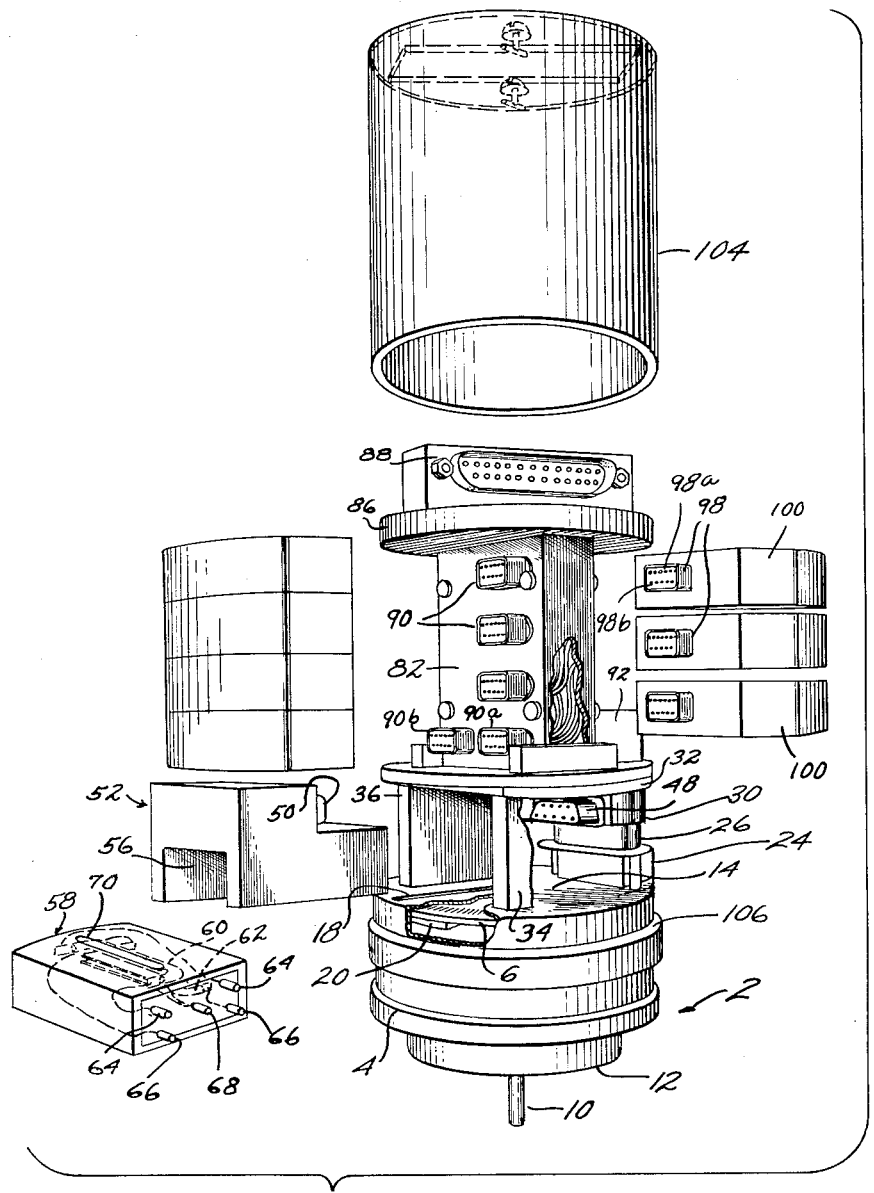
FIG. 2 is an exploded perspective view of the same encoder showing the various plug-in amplifier and strobe light modules in spaced relation to the main code wheel module, certain portions of the code wheel module being broken away to show certain internal features.
Figure 3:
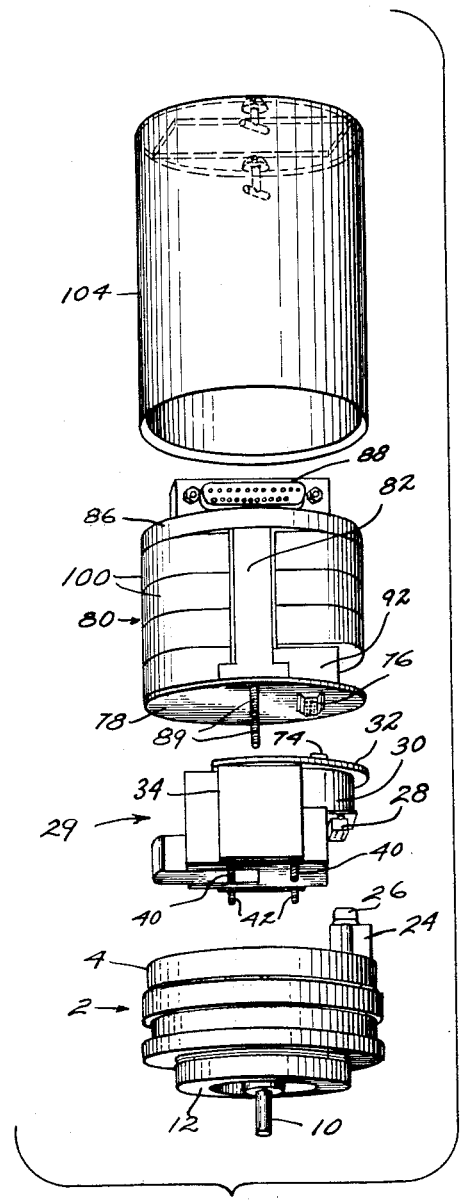
FIG. 3 is another exploded perspective view of the same encoder.

Referring now to FIGS. 1, 2, and 3, there is illustrated an optical shaft position encoder which includes a code wheel module 2 comprising a cylindrical housing 4 in which is supported a rotatable optical code wheel 6. Operatively connected to the code wheel 6 so that the latter will rotate with it is a drive shaft 10. The latter projects from one end wall 12 of housing 4. The opposite end wall 14 of the housing 4 is provided with a narrow radially extending slit or window 18 through which light may be projected at the code wheel 6.

Although not fully shown, it is to be understood that code wheel 6 is made of a transparent material and comprises a plurality of concentric code tracks, each of which is made up of alternately occurring opaque and transparent code bits arranged according to a pure or modified binary code. This type of code wheel is well known, as indicated by U.S. Patent No. 2,949,539, issued August 16, 1960, to W. K. Brown, and the text by R. K. Richards, "Digital Computer Components and Circuits," pp. 463–473, published by D. Van Nostrand Co., Inc., 1957.

In a pure binary code wheel, each track has a different number of code bits, the number of opaque and transparent bits in a track represented as $2^n$ where $n$ is the number of the track counting outward from the center of the wheel. In a reflected binary or gray code, the first two tracks each consist of two bits with the second track rotated 90 degrees from the first. The third and successive tracks consist of $2^{n-1}$ code bits where $n$ is the number of the track counting outward from the center of the wheel. In this case, let it be assumed that the encoder is capable of providing an output gray code consisting of thirteen bits which is correct for both clockwise and counterclockwise rotation of the shaft. This is achieved by providing the code wheel with fourteen tracks, the outermost of which comprises two equiangular code bits, one opaque and one transparent, which are displaced 180 degrees from the corresponding code bits of the innermost or first track. Thus, one track will provide a "1" indication when the other will produce a "0" indication. Since the innermost track of a code wheel represents the most significant number of the output binary code, the opposite displacement of the fourteenth track corresponds to the contrary relationship between clockwise rotation and counterclockwise rotations. The first and fourteenth tracks are used alternately, one on clockwise rotation and the other on counterclockwise rotation.

When light is projected into housing 4 through window 18, the light will pass through code wheel 6 except where an opaque code bit is exactly in line with the window. The light which passes through the code wheel will impinge upon a photocell and slit assembly generally identified at 20 which is mounted within the housing on the opposite side of the code wheel. This photocell and slit assembly 20 is not shown in detail because its specific mode of construction is not critical to the present invention. Thus, for example, it may be constructed like the photocell and slit assembly unit 26 of the aforementioned U.S. Patent No. 2,949,539. However, although this photocell and slit assembly unit 20 is not shown in detail, it is to be understood that, like the unit in the aforementioned U.S. Patent No. 2,949,539, it comprises a plurality of light sensitive units, i.e., photocells, arranged side-by-side along a common radial line with each photocell in registration with a different code track on the code wheel 6 which is interposed between the window 18 and the photocell and slit assembly 20. It is to be understood also that the photocells in the assembly 20 are masked by an opaque material having a narrow slit in registration with the elements and with the window 18. Therefore, some of the light projected upon the photocell and slit assembly 20 will pass through the aforesaid narrow slit and impinge upon one or more of the photocells, depending upon how many of these photocells are blocked off from the light by an opaque code area or bit. The number and the identity of the light sensitive elements energized by the light beam depends upon the instantaneous angular position of the code wheel.

Attached to the wall 14 of the housing is a hollow support 24 on which is mounted a multi-contact male connector 26. The connector 26 is attached by wires (not shown) to the electrodes of the different photocell units of the assembly 20.

Mating with the connector 26 is a female connector 58 (FIG. 3) which forms part of a strobe light module assembly 29. Connector 28 is attached to plate 32 by way of spacers (not shown) which are concealed by a removable cover 30. Attached to plate 32 is a pair of blocks 34 and 36 which space it from end wall 14 of code wheel module 2. These blocks are releasably secured to end wall 14 of housing 4 by two pairs of screws 40 and 42 which are held captive in the blocks. The heads of these screws are accessible through holes in plate 32. The screws are screwed into tapped holes in the end wall 14 of the module 2. Also secured to plate 32 by spacers (not shown) which are concealed by cover 30 is a second multi-pin female connector identified generally at 48 (FIG. 2). This female connector accommodates a mating connector 50 which forms part of a strobe light module identified generally at 52. This strobe light module contains a pulsing circuit represented at 54 in FIG. 4 and is provided with a rectangular cavity 56 which is designed to accommodate a plug-in dual lamp unit 58. The dual lamp unit contains two flash lamps indicated in phantom at 60 and 62. Appropriate terminal plugs are provided for alternately connecting the two lamps to a suitable source of power. The two terminal plugs for flash lamp 60 are identified at 64, and the two terminal plugs for flash lamp 62 are identified at 66. The fifth plug 68 is connected to a trigger or ionizing electrode. The pulsing circuit 54 is of conventional design and comprises means responsive to an external command signal for producing a trigger pulse to flash the lamp 60 or 62. The strobe light module 52 is provided with a female connector (not shown) which is mounted within the cavity 56 and which has three female contacts adapted at any one time to receive the contacts 64 and 68 or the contacts 66 and 68, depending upon whether the dual lamp unit 58 is oriented as illustrated in FIG. 2 or whether it is in a reverse position with contacts 66 disposed above contacts 64. Details of the female connector for receiving the pins of the dual lamp unit 58 are omitted since it is conventional. However, it is to be understood that it is interconnected with the connector 59 which mates with the female connector 48.

The dual lamp unit 58 is provided with a longitudinally extending slit 70 on the side nearest lamp 60. A second slit (not shown) is provided on the opposite side of the light unit in proximity to the second lamp 62. When the dual lamp unit 58 is plugged into the strobe light module 52 and the latter is plugged into connector 48, the slit 70 or its counterpart will be positioned exactly in line with the radially extending window 18 provided on the end wall 14 of the code wheel module 2. Therefore, when a flash lamp is activated, the light emitted therefrom will pass through the slit 70 or its counterpart and the window 18 into the code wheel module 2.

It is to be observed that the plate 32 is provided on its upper side with a male connector 74 (FIG. 3). This connector mates with a female connector 76 which is attached to a cylindrical plate 78. Plate 78 forms part of the body of an amplifier module assembly identified at 80. This body includes in addition to the plate 78 a hollow rectangular structure 82, a hollow end plate assembly 86 secured to the top of the hollow structure, and an output multi-contact connector 88 attached to end plate assembly 86. The foregoing unitary body is secured to the strobe light module assembly 29 by a pair of long screws 89 which are held captive in the hollow structure 82 and whose heads are accessible in end plate assembly 86. Screws 89 screw into blocks 34 and 36.

The hollow structure 82 contains a plurality of insulated wires which interconnect connector 76, connector 88, and an additional plurality of identical multi-pin connectors 90 which are mounted off-center on opposite sides of the hollow supporting structure 82. Also mounted on disk 78 on one side of structure 82 is a hollow structure 92 which provides a passageway for the wires leading from the connector 76 to connector 88 and connectors 90.

The number of female connectors 90 which are mounted on the hollow structure 82 is greater on one side than it is on the other. In this case, three connectors are mounted on the same side of hollow structure 82 as hollow block 92, and five connectors are mounted on the opposite side of the same structure. However, it is to be noted that two of the connectors identified as 90$a$ and 90$b$ are mounted side-by-side. Connectors 90 have two horizontal rows of female contacts for accepting multi-contact plug connectors 98 which have two rows of contacts 98$a$ and 98$b$ each and which are attached to the fronts of identical dual amplifier modules 100. Each connector 98 is located closer to one side than the other of its associated module 100. Each amplifier module 100 consists of two separate but identical amplifiers A and B (FIG. 4) of conventional circuit design which are connected to contacts 98$a$ and 98$b$ respectively. Thus, the total number of amplifiers carried by the encoder is 14, equal to the total number of code tracks on the code wheel but one more than the number of tracks used at any one time. Accordingly, there is an extra amplifier available for standby use. By means of the construction hereinafter described, it is possible to utilize this extra amplifier in the event one of the other amplifiers becomes inoperative.

It is to be understood that connectors 99 are of the uni-positional or one-way type, that is, they accommodate plug connectors 98 only when the latter are oriented in a particular pin-matching position. In FIG. 2, all of the connectors except 90b are disposed so as to accept an amplifier module 100 when its contacts 98a and 98b are oriented above and below as shown. Connector 90b is inverted so as to accept an amplifier connector 98 only when its contacts 98a and 98b also are inverted.

Certain contacts in one row of each connector 90 are connected to one photocell unit and certain contacts in its other row are connected to another photocell unit of photocell assembly 20. Connector 90a has certain contacts in its top row (as seen in FIG. 2) connected to the photocell associated with the first code track and certain contacts in its bottom row connected to the photocell associated with its fourteenth track. Accordingly, if an amplifier module is plugged into connector 90a, only one of its amplifiers A and B will be used, and this will be the one connected to the photocell unit for the code track for the particular duration of rotation. Inverted connector 90b also has certain contacts in its top row (as seen in FIG. 2) connected to the photocell for the first code track and certain contacts in its bottom row connected to the photocell for its fourteenth code track. In other words, certain contacts on connector 90b which would normally be used for amplifiers A and B of a module 100 are connected in parallel with certain contacts on connector 90a which are used for amplifiers B and A respectively. As a result of this arrangement, if one of the amplifiers of a module becomes inoperative or is otherwise unsatisfactory, the module 100 of which it is a part may be replaced by a fully useable module plugged into connector 90a or 90b. The defective module may then be plugged into connector 90a or 90b, depending upon which one amplifier unit is still useable and which of the first and fourteenth tracks is being utilized.

Covering the entire foregoing encoder assembly is a cylindrical cover identified generally at 104. The latter slides down over the end plate assembly 86 and the plates 32 and 78 and engages a shoulder 106 formed on the code wheel module 2. The end wall 108 of the cover has an aperture to accommodate connector 88. Mounted on end wall 108 are two quarter-turn fasteners 110 which are accepted by receptacles in end plate assembly 86 to lock the cover to the encoder. Cover 104 protects the strobe light unit 52 and the amplifier modules 100 from the atmosphere.

The encoder system embodied in the foregoing construction is illustrated schematically in FIG. 4. Also shown in FIG. 4 are a flash lamp power supply 120 and an amplifier power supply 122. These units are exterior of the encoder previously described, and for this reason they are identified as external supplies.

Operation of the encoder is as follows: The code wheel 6 is driven through the shaft 10. Readout command pulses are applied via an input terminal 124 of connector 88 to the pulser circuit 54 of strobe module 52, producing a sharp trigger pulse which causes one of the lamps 60 and 62 to flash briefly. Some of the light from the lamp will pass through code wheel 6 and impinge upon the photocell assembly 20, causing one or more of the photocell detectors to be energized. The resulting outputs of the individual photocells are directed to separate amplifiers associated therewith. The amplified signals are applied via connector 88 to a computer or other electronic instrument.

It is believed to be apparent from the foregoing description that the encoder is complete except for the external supplies required to energize the strobe lamp module 52 and the amplifiers. The plug-in modular construction of the encoder facilitates assembly and disassembly, permitting ready and rapid replacement or interchange of parts. Accordingly, the encoder is exceptionally suited to use in the field in remote areas where access to parts is non-existent.

Obviously, many modifications and variations of the present invention are possible in the light of the above teachings. Thus, for example, the packaging concept of the present invention is applicable as well to encoders using a continuous light instead of a strobe light. Similarly, the number of code tracks and, therefore, the number of amplifier channels may be increased or decreased in accordance with the end use requirements.

It is also to be understood that the nature of certain of the components may be varied without departing from the general packaging technique herein described and claimed. Thus, for example, one or more of the amplifier modules may be replaced by other electronic modules as, for example, flip-flops, or combination amplifier-flip-flop modules. Of course, the type of amplifier may also be varied according to the requirements of the proposed end use of the encoder. Furthermore, the code embodied in the code wheel need not be a reflected binary code or even a binary code; it could be some other type of code having as little as one code track. It is to be understood, therefore, that the invention is not limited in its application to the details of construction and arrangement of parts specifically described or illustrated, and that within the scope of the appended claims, it may be practiced otherwise than as specifically described or illustrated.

We claim:

1. A precision shaft position encoder assembly comprising a code wheel module having a rotatable shaft for connection to a drive unit, said code wheel module including an optical code wheel with at least one concentric code track and a photosensitive detector for each code track disposed to detect the presence or absence of illumination at a predetermined location with respect to said each code track, a series of first electrical connectors affixed to said code wheel module in association with the photosensitive detectors, a light module assembly for providing a narrow light beam, said light module assembly having a series of second electrical connectors affixed thereto, said first series of electrical connectors of said code wheel module and said second series of electrical connectors of said light module being detachably mateable, under which condition said light beam is directed at said predetermined location, and an amplifier module assembly comprising an amplifier module for each detector, said amplifier module assembly having a series of third electrical connectors, said light module having a series of fourth electrical connectors, said third electrical connectors and said fourth electrical connectors being detachably mateable.

2. An encoder assembly as defined by claim 1 further including a cover surrounding said light module assembly and said amplifier module assembly.

3. An encoder assembly as defined by claim 1 wherein said light module assembly comprises a frame with said first means attached thereto, and a light module detachable from said frame.

4. An encoder assembly as defined by claim 3 wherein said light module comprises means for making a plug-in connection with said frame.

5. An encoder assembly as defined by claim 3 wherein said light module is a strobe light module having a plug-in strobe lamp unit.

6. An encoder assembly as defined by claim 5 wherein said lamp unit comprises two lamps, with one lamp adapted to be energized when the lamp unit is plugged in said strobe light module with said one lamp facing said code wheel module and the other lamp adapted to be energized when the lamp unit is plugged into said strobe light module with said other lamp facing said code wheel module.

7. An encoder assembly as defined by claim 1 wherein each amplifier module is a plug-in unit and said amplifier module assembly comprises a supporting body into which said each amplifier module is plugged.

8. An encoder assembly as defined by claim 7 comprising a plurality of amplifier modules and further wherein said supporting body includes a hollow elongated structure disposed in diametral alignment with said code wheel module, said ampifier modules disposed on opposite sides of said elongated structure.

9. An encoder assembly as defined by claim 8 wherein said supporting body includes a circular end plate with said second means attached to said end plate.

10. An encoder assembly as defined by claim 9 wherein said supporting body includes a second circular end plate attached to the opposite end of said block, said second end plate having a multi-contact connector for electrical connections external of said encoder assembly.

11. An optical shaft encoder assembly comprising a code wheel module having a housing with opposite end walls, one of said end walls having a radial slit, a rotatable optical code wheel within said housing, a plurality of light sensitive signal generating elements disposed within said housing between said code wheel and the other end wall, said light sensitive elements spaced disposed along a common imaginary radial line in alignment with different code tracks on said code wheel, and a multi-module package releasably secured to said other end wall, said multi-module package comprising a plurality of amplifier modules each having a series of first electrical connectors, a series of second connectors on said housing, said first electrical connectors and said second electrical connectors being detachably mateable, and a strobe light module assembly adapted to provide a narrow beam of light, said strobe light module assembly sandwiched between said code wheel module and said amplifier module assembly and disposed so as to direct said beam of light through said radial slit.

12. An optical shaft encoder as defined by claim 11 wherein said strobe light module assembly has a passageway for leads interconnecting said light sensitive signal generating elements and said amplifier modules.

13. An optical encoder as defined by claim 11 further including a cylindrical cover surrounding and concealing said multi-module package, said cover being attached to said housing.

14. A precision shaft position encoder assembly comprising a code wheel module having a rotatable shaft for connection to a drive unit, said code wheel module including an optical code wheel with a plurality of concentric code tracks and a plurality of radially aligned photosensitive detectors disposed to detect the presence or absence of illumination with respect to separate tracks, a light module assembly for providing a narrow light beam, said light module assembly having a series of first electrical connectors, said code wheel module having a series of second electrical connectors, said first electrical connectors and said second electrical connectors being detachably mateable, under which conditions said light module assembly and said code wheel module are relatively positioned with said light beam oriented in radial registration with said detectors, and an amplifier module assembly comprising a plurality of amplifier modules, one amplifier for each detector, said amplifier module assembly having a series of third electrical connectors, said light module assembly having a series of fourth electrical connectors, said third electrical connectors and said fourth electrical connectors being detachably mateable.

15. A precision shaft position encoder assembly comprising a plurality of components including a code disk component rotatable about an axis for connection to a drive means, said code disk component having a plurality of concentric code tracks, a plurality of photodetector components in registration with said code tracks, a source component for illuminating said code tracks in the vicinity of said photodetector components in order to generate signals representing the angular position of said code disk component, a plurality of circuit components for amplifying said signals, a plurality of modular mounts, a first of said modular mounts carrying at least said code disk component, a second of said modular mounts carrying others of said components, a first electrical-mechanical connector affixed to said first of said modular mounts, a second electrical-mechanical connector affixed to said second of said modular mounts, said first electrical-mechanical connector including first mechanical interconnecting means and a series of first electrical interconnecting means, said second electrical-mechanical connector including second mechanical interconnecting means and a series of second electrical interconnecting means, said first electrical-mechanical connector and said second electrical-mechanical connector being detatachably mated, said first of said modular mounts and said second of said modular mounts being predeterminedly relatively positioned by the interconnection of said first mechanical interconnecting means and said second mechanical interconnecting means, the components of said first of said modular mounts and the components of said second of said modular mounts being electrically operatively associated by the interconnection of said first series of electrical means and said second series of electrical means.

16. The precision shaft position encoder of claim 15 wherein said source component includes a casing, a first source and a second source within said casing, said casing having a first slit on a first side thereof through which said first source is optically accessible and a second slit on a second side thereof through which said second source is optically accessible, a selected one of said first slit and said second slit being in registration with said photodetector components.

17. The precision shaft position encoder of claim 15 including a plurality of said modular mounts containing said plurality of circuit components, the number of said circuit components being at least one more than the number of said code tracks.

References Cited in the file of this patent
UNITED STATES PATENTS

| | | |
|---|---|---|
| 2,177,077 | Potts | Oct. 24, 1939 |
| 2,493,519 | Baltosser | Jan. 3, 1950 |
| 2,981,844 | Broxon | Apr. 25, 1961 |
| 3,023,406 | Jones | Feb. 27, 1962 |

OTHER REFERENCES

Hoyt et al.: I.R.E. National Convention Record, April 1953, pp. 77–83.

Bunce: Instruments and Automation, vol. 30, November 1957, pp. 2064–2065.